J. Temple,
Water Wheel,

№ 22,901. Patented Feb. 8, 1859.

Witnesses:

Inventor:
John Temple

UNITED STATES PATENT OFFICE.

JOHN TEMPLE, OF MIDDLETOWN, OHIO, ASSIGNOR TO TEMPLE, MILLS & STOUT, OF SAME PLACE.

IMPROVED SLUICE FOR WATER-WHEELS.

Specification forming part of Letters Patent No. 22,901, dated February 8, 1859.

*To all whom it may concern:*

Be it known that I, JOHN TEMPLE, of Middletown, in the county of Butler and State of Ohio, have invented a new and useful Improvement in Sluices for Water-Wheels; and I hereby declare the following to be a full and exact description of the same, reference being had to the accompanying drawings, making part of this specification.

This is an improvement in what are technically known as "scroll-sluices," being those in which the feed-passages where they empty into the wheel converge in the exact ratio of their depletion; and my invention relates to a construction of scroll-sluice gates, whereby the feed-passages, while retaining their ratio of convergence, may be expanded or contracted with extreme facility and accuracy under any head or flow of water.

The accompanying drawings above referred to illustrate the application of my invention to a vortical or central discharge reaction-wheel.

Figure 1:
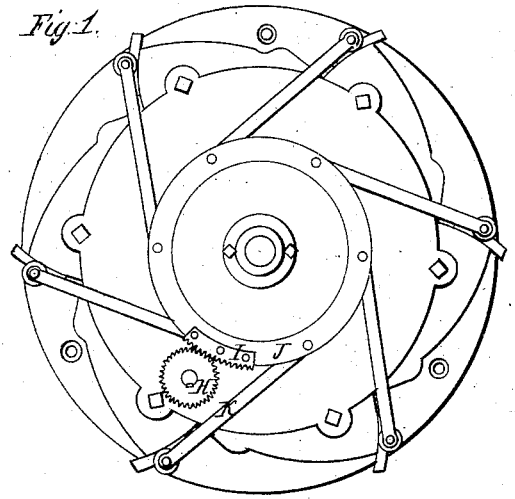
Figure 3:
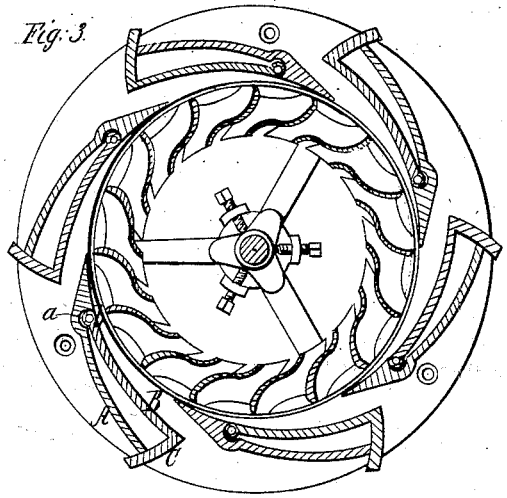
Figure 2:
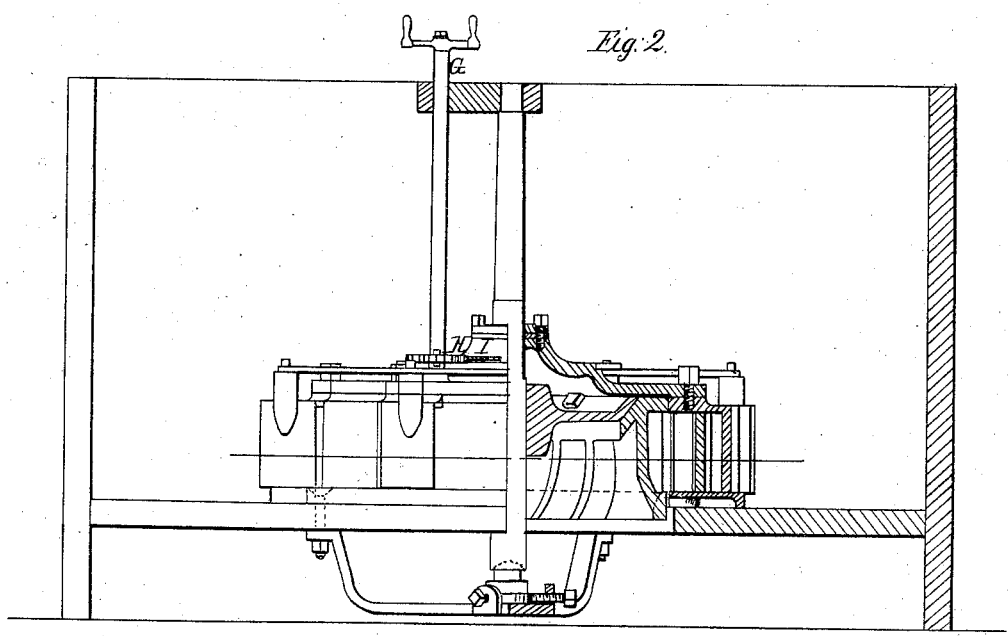

Figure 1 is a top view of the sluice-chest. Fig. 2 is a view partly in axial section and partly in elevation. Fig. 3 is a horizontal section at $x\ x$, Fig. 2.

The curb of the sluice-chest is composed of a series of equidistant scroll-chutes A, each having a gate B C, the wing B of which is curved to correspond with the concavity of the chute, and is constructed with a cylindrical bead $b$ at its forward end, which fits into a suitable socket $a$ in the chute, so as to form a hinge.

C is a segmental reverted lip concentric with the hinge $a\ b$, serving, when the gate is partially or wholly closed, to prevent the flow of water behind it, and thus keep it in equilibrio.

G is a winch, the rotation of which imparts a slow motion out or into the gates by means of suitable transmitting mechanism H I J K. The joints between the curb and gate are sufficiently open to permit the slow passage of water incident to the motion of the latter, but sufficiently close to prevent the forcible closing of the gates by an entering current.

It will be seen that whether the gate is open or partially closed the wings B afford a regularly-graduated scroll-chute, which, whether a large or a small amount of water is admitted, holds the water uniformly to its work on the wheel. It will also be observed that in every position of the gates the stress of the current is transmitted directly to the knuckle or hinge of the gate, leaving the latter substantially in equilibrio, and preventing its friction or pressure on its seat.

I claim as new and of my invention herein—

The winged gates B C, constructed, arranged, and operating in combination with a series of scroll-chutes A, substantially in the manner and for the purpose set forth.

In testimony of which invention I hereunto set my hand.

JOHN TEMPLE.

Attest:
GEO. H. KNIGHT,
J. G. B. LEFFERSON.